(No Model.) 2 Sheets—Sheet 1.

C. & T. HOLLY.
CHEESE MACHINE.

No. 372,149. Patented Oct. 25, 1887.

WITNESSES:
A. P. Grant
W. F. Kircher

INVENTORS
Charles Holly
Theodore Holly
By John A. Wiedersheim
Attorney.

(No Model.) 2 Sheets—Sheet 2.

C. & T. HOLLY.
CHEESE MACHINE.

No. 372,149. Patented Oct. 25, 1887.

WITNESSES:
A. P. Grant,
W. F. Kircher

INVENTORS
Charles Holly
Theodore Holly
By John A. Wiedersheim
Attorney

N. PETERS, Photo-Lithographer, Washington, D. C.

UNITED STATES PATENT OFFICE.

CHARLES HOLLY AND THEODORE HOLLY, OF SELLERSVILLE, PENNSYLVANIA.

CHEESE-MACHINE.

SPECIFICATION forming part of Letters Patent No. 372,149, dated October 25, 1887.

Application filed May 18, 1885. Serial No. 165,824. (No model.)

*To all whom it may concern:*

Be it known that we, CHARLES HOLLY and THEODORE HOLLY, citizens of the United States, residing at Sellersville, county of Bucks, State of Pennsylvania, have invented a new and useful Improvement in Cheese-Machines, which improvement is fully set forth in the following specification and accompanying drawings, in which—

Figure 1:
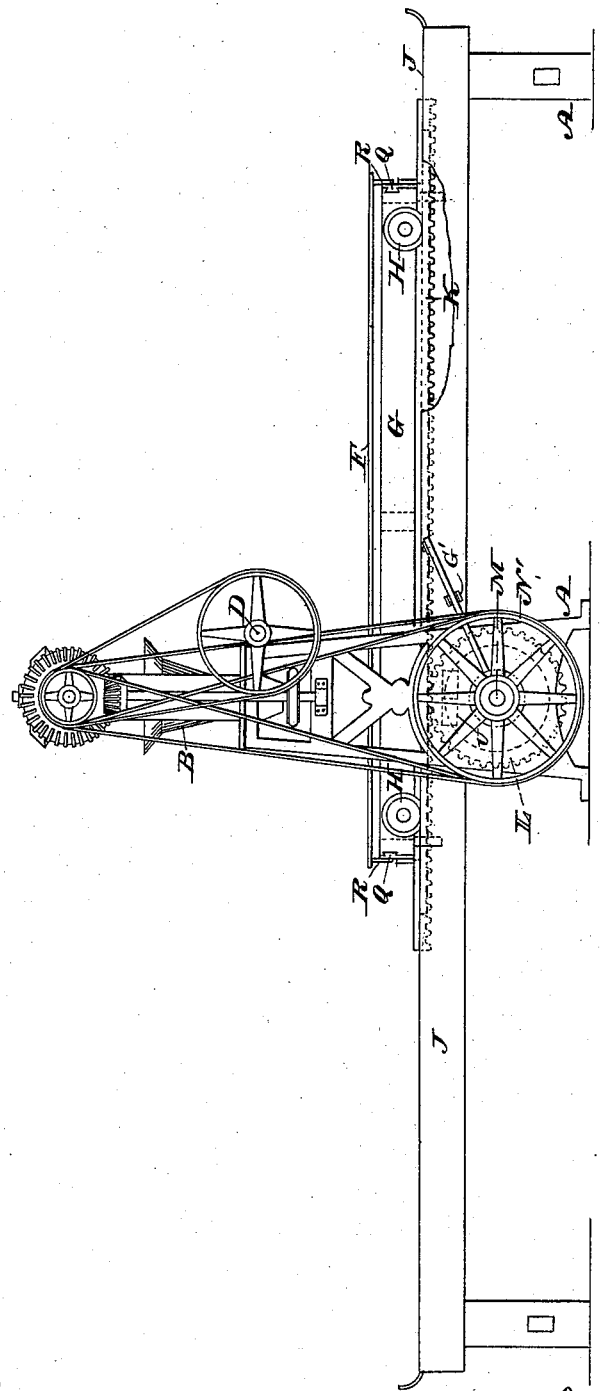
Figure 2:
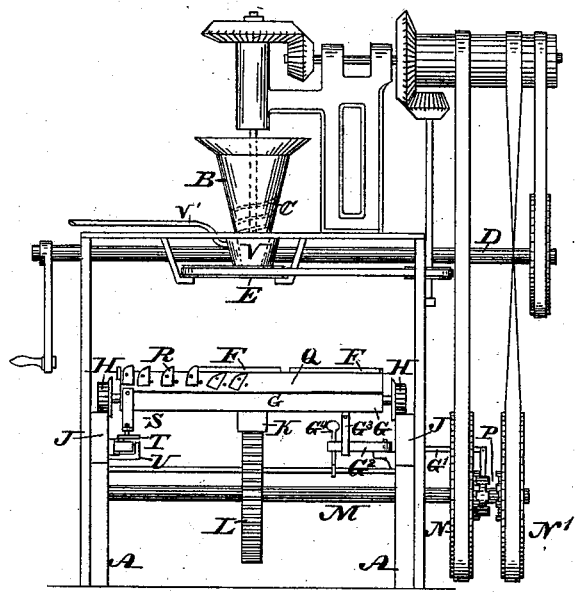
Figure 3:
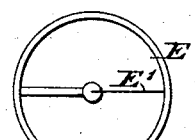
Figure 7:
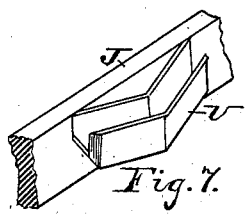
Figure 4:
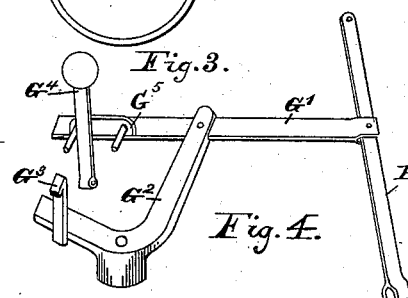
Figure 5:
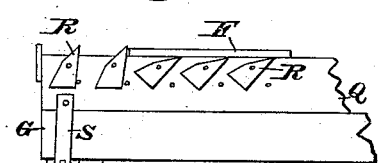
Figure 6:
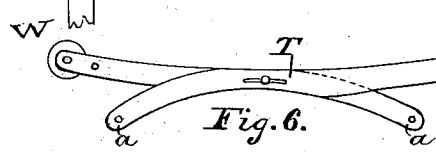

Figure 1 represents a side elevation of a cheese-machine embodying our invention. Fig. 2 represents an end elevation thereof. Fig. 3 represents a top or plan view of the cutting device. Fig. 4 represents a perspective view of part of the reversing mechanism, the arm $G^3$ of the table being shown separate therefrom and bearing against the lever $G^2$. Fig. 5 represents a view of a portion of Fig. 1 on an enlarged scale. Fig. 6 represents a top or plan view of a detached portion. Fig. 7 represents a perspective view of a detached portion.

Similar letters of reference indicate corresponding parts in the several figures.

Our invention consists of a cheese-machine embodying means for readily discharging the curd from the hopper, uniformly depositing the curd as cakes on boards or supports, and laterally shifting said supports so that the cakes or cheeses are uniformly laid in rows, the said cheeses being made from what is commonly known as "cottage-cheese" or "schmierkase" dropped into cakes on the board, dried thereon, and afterward ripened.

Referring to the drawings, A represents the frame of the machine, on which is supported a hopper, B, the latter having within the same a screw, C, for forcing the curd through the bottom thereof, the shaft of said screw being connected with gearing to which power is applied from the driving-shaft D of the machine.

Supported below the hopper B is a rotary cutter, E, consisting of an annulus or ring having a wire, E', radially arranged therewith and secured thereto in any suitable manner, said annulus being rotated by a band operated by a pulley connected with the gearing of the machine, so that as it is rotated its wire acts as a shear at the bottom of the hopper and cuts off a quantity of curd, which quantity drops as a cake or cheese on boards or supports F, placed on a table or carriage, G, below the cutter, said table being mounted on shafts having wheels H, which are adapted to run on ways or tracks J, connected with the frame of the machine. On the under side of the table is a rack-bar, K, with which meshes a pinion or toothed wheel, L, the latter being keyed or otherwise secured to a shaft, M, which is operated by a band-wheel, N, the band whereof passes around a drum to which the power of the driving-shaft is imparted. On the shaft M is also mounted a band-wheel, N', which rotates in reverse direction to the band-wheel N, said wheel N' being operated by a cross-belt passing around the drum above referred to, each of the wheels N N' being adapted to be engaged by clutch mechanism P, for the purpose of rotating the shaft M either forward or backward, and thus imparting motions to the table G in opposite directions, the shifting mechanism employed consisting of a shifting-lever, G', to which is attached an elbow-lever, $G^2$, both mounted on the frame A.

$G^3$ represents arms, which are so placed on the under side of the table as to come in contact with the said lever $G^2$ at the end of each backward and forward motion of the table, so that by means of a weighted arm, $G^4$, mounted on the frame A, the elbow-lever may be moved in opposite directions, thus causing the engagement or disengagement of the wheels N and N', and consequently the forward or backward movement of the table.

At the ends of the table G are transversely-arranged slides Q, connected at their ends by bars, so as to insure a simultaneous movement thereof. Each of the said slides are provided with dogs R, pivoted thereto, the latter being weighted or mounted eccentrically in order to assume an upright position, the noses of said dogs projecting above the upper edge of the slides and being adapted to engage with the backs of the boards on which the cheeses are dropped. Connected with the slides are arms S, which are attached to jointed levers T at *a a*, one of the levers having a pin or stud working in a slot in the other lever, the levers working after the manner of lazy-tongs, the longer limbs of said levers having rollers W at their ends, which rollers are adapted to enter the angular grooved ways U, attached to one of the slides of the frame near the center thereof, it being seen that as one of the said rollers W passes along the said way U the ends of the levers are operated so as to move the arms S and thereby the slides Q.

The operation is as follows: When a board is placed on the table, its ends are rested against the vertical sides of the first set of dogs on the slides, and when the machine is set in motion the curd is forced from the bottom of the hopper by the action of the screw, and being severed in regular quantities by the wire or cutter E' drops on the board. The table then advances, and the cheeses are regularly deposited on the board in a row in the direction of the length thereof when the table has made its full motion. The rollers on the toggle-lever T enter the angular grooved ways U, thereby carrying the arms S away from the ways J, thus causing the slides Q to move the board F, resting on the table G laterally the distance between the two adjacent sets of dogs. As the slide returns, owing to the action of the lever T, a dog becomes clear of the board and presents its perpendicular side thereto, thereby being in readiness to assist in the next movement of the said board, which latter is now prepared to receive another row of cheeses, and the table returns and the row is deposited, and thus the operation continues until the board is filled full, when the same is removed, other boards having in the meantime been placed on the table, so that provision is made for the deposit of the cheeses on boards until the supply is exhausted, it being evident that the slides are operated at the end of each motion of the table; and owing to the reversing-gear and clutch mechanism the table moves regularly in opposite directions, so that there is uniformity in the work and an ease and rapidity in the operation of forming a large number of cheeses.

Owing to the difficulty of properly and smoothly discharging the curd from the hopper, we find it important to heat the same, so that it is in a proper condition to leave the hopper and deposit on the board. For this purpose we apply a steam-jacket, V, around the lower end of the hopper, which is of the form of a closed trough having a steam-supply pipe connected with it. The amount of steam desired to be used is small, only sufficient to sweat the inner walls of the hopper, so as to lubricate the same and prevent the cottage-cheese or schmierkase from sticking in the hopper.

Having thus described our invention, what we claim as new, and desire to secure by Letters Patent, is—

1. In a cheese-machine, the combination of a hopper having a screw within the same, an annulus below said hopper, a cross-wire in said annulus, and means for rotating said annulus, substantially as and for the purpose set forth.

2. In a cheese-machine, the combination of a hopper having a screw within the same and provided with a surrounding steam-jacket with an annulus having a cross-wire, and means, substantially as described, for rotating said annulus.

3. A cheese-making machine having a hopper with a discharging-screw and means, substantially as described, for rotating the same, in combination with the annulus E, with cross-wire E', and means, substantially as described, for rotating said annulus, a table with rack K, the gear-wheel L, and means, substantially as described, for rotating said gear-wheel, substantially as described.

4. In a cheese-making machine, a vertical hopper with a steam-jacket surrounding the base thereof, a discharging screw, with means, substantially as described, for rotating the same, an annulus with cross-wire at base of said hopper, means, substantially as described, for rotating said annulus, a table with a rack, a gear-wheel meshing with said rack, and means, substantially as described, for rotating said gear-wheel, substantially as and for the purpose set forth.

5. The reciprocating table G, carrying the movable board F and having slides Q, arranged transversely at each of its ends and provided with weighted dogs R, in combination with arms S, levers T, and ways U, for operating said slides, substantially as and for the purpose set forth.

6. The table G, having slides Q, provided with weighted dogs R, in combination with arms S, toggle-levers T, having rollers, and tracks J, having ways U, substantially as and for the purpose set forth.

7. A cheese-machine having a hopper provided with a discharging-screw and a rotary cutter beneath said board, a reciprocating table beneath said hopper, a movable board on said table, end slides on said table having weighted dogs, and arms, levers, and ways, substantially as described, for actuating said dogs, said parts being combined substantially as and for the purpose set forth.

CHARLES HOLLY.
THEODORE HOLLY.

Witnesses:
SAMUEL R. HARING,
F. A. HENDRICKS.